June 15, 1965     G. R. HOFFMASTER     3,189,913
DETACHABLE NOSE BRIDGE
Filed Nov. 29, 1960
*Fig. 1.*
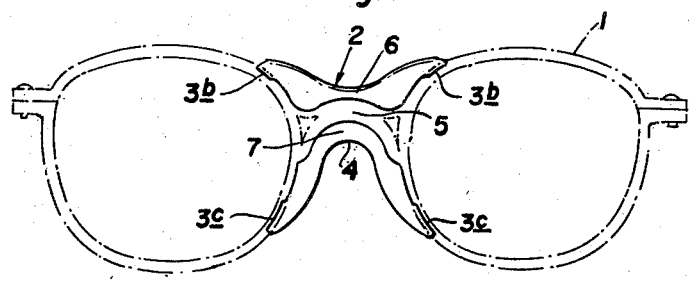
*Fig. 2.*     *Fig. 3.*     *Fig. 4.*
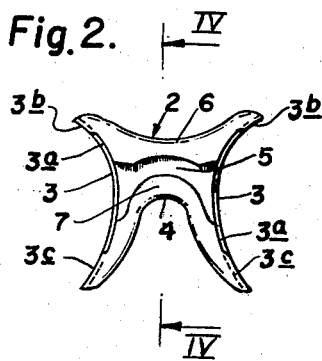 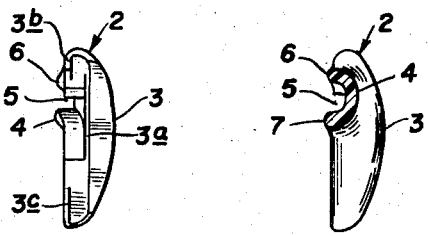 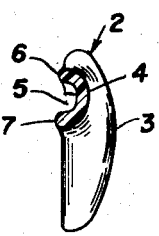
*Fig. 5.*
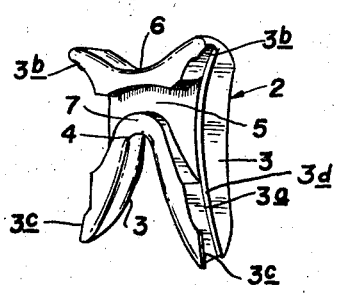
INVENTOR.
George R. Hoffmaster
BY
William J. Ruano
ATTORNEY

3,189,913
DETACHABLE NOSE BRIDGE
George R. Hoffmaster, Reading, Pa., assignor to The
Electric Storage Battery Company, Philadelphia, Pa.
Filed Nov. 29, 1960, Ser. No. 72,496
1 Claim. (Cl. 351—130)

This invention relates to a detachable nose bridge for use on spectacles, such as safety spectacles, for the purposes of providing a more comfortable fit for widely varying nose sizes of different wearers and to enable the spectacles to be comfortably worn without nosepads on the nose of a wearer.

It is known in the art to provide a detachable plastic element to bridge a portion underneath the nose bridge of a pair of spectacles, such as safety spectacles, for providing a more comfortable fit.

An outstanding disadvantage of presently known detachable plastic nose bridges is that they must be fitted very closely and are useful for only one size of spectacles, also they are relatively difficult to attach or detach.

An object of my invention is to provide a detachable nose bridge element which is devoid of the above named disadvantages and which is extremely easy to attach or detach, and which is adapted to fit a wide range of sizes of spectacles and to provide a tight fit with any of such spectacles of different size.

Other objects and advantages will become more apparent from a study of the following description taken with the accompanying drawing wherein:

FIG. 1 is a plan or elevational view showing a pair of safety spectacles, in dot and dash outline, onto which is attached a detachable nose bridge element embodying the principles of my invention;

FIG. 2 is a plan view of the detachable nose bridge element shown in FIG. 1;

FIG. 3 is a side view of a detachable bridge shown in FIGS. 1 and 2 as viewed from the right of the figures;

FIG. 4 is a cross-sectional view taken along line IV—IV of FIG. 2; and

FIG. 5 is a perspective view of the detachable nose bridge element shown in FIGS. 1 to 4 inclusive.

Referring more particularly to FIG. 1 of the drawing, numeral 1 denotes, in dot and dash outline, a pair of spectacles, such as safety spectacles, having a metal bridge element of well known design. Numeral 2 generally denotes a detachable bridge element, preferably of any suitable plastic material, such as nylon, butyrate, acetate, "Lucite" or, in fact, any plastic or other suitable material which has at least a small amount of flexibility.

The detachable plastic nose bridge element or nose piece 2 is of generally H shape configuration, wherein the legs of the H are outwardly curved so as to closely fit the inner portions of the rims of spectacle 1, as will be more apparent in FIG. 2. The nose bridge element 2 is provided with a nose surrounding portion 4 of smooth curved outline which is shaped so as to fit varying nose sizes and to enable spectacles to be worn comfortably, without nosepads, by the wearer, and to provide a much more comfortable fit than provided by the metal nose bridge. A notch or groove 5 is provided on the outside of the nose piece and is curved so as to fit closely about the bridge element of the spectacles 1, the extremities of the groove being flared outwardly. The top portion 6 is somewhat wing shaped and has upwardly and outwardly curved extremities terminating in cradle portions including flanges 3b for partially surrounding the rim portions of the spectacle which they engage, forming a tight anchor therewith. Similarly the lower portion 4 of the nose bridge element 2 is in the form of wings which terminate in cradle portions partially formed of flanges 3c for closely hugging and surrounding the corresponding rim portions of the spectacles. Arcuate grooves 3a are provided along the legs of the substantially H shaped element and of the curvature thereof closely corresponding to those of the contacting rim portions of spectacles 1. Lateral movement of the spectacle rims relative to nose piece 2 is prevented by the curved ledges 3d and the flanges or stop elements 3b and 3c, will be apparent in FIG. 5.

In operation, when the nose piece 2 is to be attached to the spectacles, the spectacles are either pushed against the nose piece 1 as shown in FIG. 1, or vice versa, until the extremities of the wings 6 and 4 have snapped over or cleared the corresponding rim portions of the glasses and until the rims rest on ledges 3d. That is to say, by camming action provided by flanges or stop elements 3b and 3c, the extremities of wings 6 and 4 are sprung or flexed sufficiently so as to clear and then snap over the rims of the spectacles. The outer, radially extending, front flanges 3b and 3c are adapted to closely hug the front portions of the rims and to serve as front stop elements. Thus is provided at least an assured four point bearing support with grooves 3a particularly in the vicinity of flanges 3b and 3c. Of course, the intermediate portions grooves 3a are curved so as to closely fit the rim portions of the spectacles. However, it will be especially noticed that the detachable nose bridge element 2 is adapted to fit a wide variety of sizes of spectacles because even though larger spectacles have relatively larger diameters, nevertheless the fit against grooves 3a, particularly adjacent flanges 3b and 3c, is still the same.

Since only the extremities of wings 4 and 6 must yield when attaching the nose bridge element 2 to the spectacles, then since such extremities are of relatively small cross section and are considerably spaced apart, a substantial moment arm can be applied to effect yielding with very little application of force. Detachment of the nose piece is equally easy to accomplish for substantially the same reasons.

Thus it will be seen that I have provided an efficient detachable plastic nose bridge element for spectacles which is very easy to attach or detach and which can be tightly fitted to a wide variety of sizes of spectacles, therefore eliminating the necessity of stocking a detachable nose piece for each size of spectacles.

While I have illustrated and described a single specific embodiment of my invention, it will be understood that this is by way of illustration only, and that various changes and modifications may be made within the contemplation of my invention and within the scope of the following claim.

I claim:

A detachable nose bridge element for spectacles of different sizes, said nose bridge element being of plastic material having at least a small amount of flexibility and being of substantially H shape with four legs curved outwardly to closely confront the rim portions of the spectacles adjacent the nose bridge thereof, said element having, on one side, a lateral and substantially central groove which is upwardly curved at the center and flared outwardly at the ends so that said nose bridge and those of other sizes will freely fit therein, two of said legs forming an upper wing shaped portion whose extremities comprise cradle portions which engage the top portions of the spectacle rims well above the nose bridge, and the remaining two legs forming a lower wing shaped portion whose extremities comprise cradle portions which engage the portions of the spectacle rims below the nose bridge to provide a four point support which enables use on spectacles of various lens diameters and nose bridge sizes, all four of said cradle portions being partially formed of short flanges, compared with the length of said legs, on the grooved side of said element, of relatively reduced cross-section compared with the remainder of said element and which short flanges are substantially spaced from said groove so as to provide sufficeint moment arms so as to readily yield and snap onto said confronting rim portions as said element is attached to the spectacles, said flanges serving as cams to effect springing and as stop elements after said legs have been sprung and attached to the rim portions of said spectacles.

References Cited by the Examiner

UNITED STATES PATENTS

| | | | |
|---|---|---|---|
| 2,582,345 | 1/52 | Moeller | 88—55 |
| 2,612,076 | 9/52 | Dietz. | |
| 2,682,196 | 6/54 | Baldanza et al. | 88—48 X |
| 2,801,569 | 8/57 | Ralph | 88—55 X |
| 2,844,995 | 7/58 | Belgard | 88—43 X |
| 3,016,797 | 1/62 | Liautaud | 88—43 |

JEWELL H. PEDERSEN, *Primary Examiner.*

EMIL G. ANDERSON, FREDERICK M. STRADER, *Examiners.*